United States Patent [19]

Alexander

[11] Patent Number: 5,246,575
[45] Date of Patent: Sep. 21, 1993

[54] MATERIAL EXTRACTION NOZZLE COUPLED WITH DISTILLATION TOWER AND VAPORS SEPARATOR

[75] Inventor: Richard A. Alexander, Mobile, Ala.

[73] Assignee: Mobil Oil Corporation, Fairfax, Va.

[21] Appl. No.: 825,342

[22] Filed: Jan. 24, 1992

Related U.S. Application Data

[62] Division of Ser. No. 521,957, May 11, 1990, Pat. No. 5,106,514.

[51] Int. Cl.⁵ .............................. B01D 3/00
[52] U.S. Cl. ....................... 210/188; 55/315; 55/459.1; 62/5; 62/36; 202/202; 209/144; 210/201; 210/259; 210/511; 210/512.1; 210/512.2
[58] Field of Search .............. 55/17, 277, 315, 346, 55/349, 201, 204, 459.1; 62/5, 11, 23, 36, 42, 44; 202/202; 210/259, 512.1, 512.2, 181, 182, , 188, 201, 511, 788, 806; 209/144, 211

[56] References Cited

U.S. PATENT DOCUMENTS

| | | | |
|---|---|---|---|
| 2,816,490 | 12/1957 | Boadway et al. | 92/28 |
| 2,894,371 | 7/1959 | Auer et al. | 62/36 |
| 3,362,131 | 1/1968 | Becker et al. | 55/17 |
| 3,775,988 | 12/1973 | Fekete | 62/23 |
| 3,862,714 | 1/1975 | Boadway | 210/512.1 |
| 4,048,067 | 9/1977 | Cheng | 210/73 R |
| 4,123,364 | 10/1978 | Mozley | 210/512 |
| 4,185,977 | 1/1980 | Shirokov et al. | 62/5 |
| 4,251,368 | 2/1981 | Colman et al. | 210/788 |
| 4,257,794 | 3/1981 | Shirokov et al. | 62/5 |
| 4,389,307 | 6/1983 | Boadway | 209/211 |
| 4,541,845 | 9/1985 | Michel-Kim | 55/17 |
| 4,576,724 | 3/1986 | Colman et al. | 210/788 |
| 4,629,555 | 12/1986 | Colman et al. | 209/144 |
| 4,670,161 | 6/1987 | Hayatdovoudi | 210/739 |
| 4,749,490 | 6/1988 | Smyth et al. | 210/512.1 |
| 4,764,287 | 8/1988 | Colman et al. | 210/788 |
| 4,793,924 | 12/1988 | Colman et al. | 210/512.1 |
| 4,810,382 | 3/1989 | Colman et al. | 210/512.1 |
| 4,842,145 | 6/1989 | Boadway | 209/144 |
| 4,844,817 | 7/1989 | Flanigan et al. | 210/788 |
| 4,859,347 | 8/1989 | Simon et al. | 210/788 |
| 4,886,523 | 12/1989 | Maldague | 55/1 |
| 5,106,514 | 4/1992 | Alexander | 210/788 |

FOREIGN PATENT DOCUMENTS

| | | | |
|---|---|---|---|
| 23523 | 8/1962 | Fed. Rep. of Germany | 210/512.1 |
| 144211 | 2/1963 | Fed. Rep. of Germany | 210/512.1 |
| 851031 | 7/1981 | U.S.S.R. | 62/5 |

Primary Examiner—Joseph W. Drodge
Attorney, Agent, or Firm—Alexander J. McKillop; George W. Hager, Jr.; Michael J. Mlotkowski

[57] ABSTRACT

A material extraction nozzle for separating a mixture of materials having different densities, comprising: a nozzle body shell having an outer surface with a tangentially located material inlet at an upper portion thereof and an inner surface defining in part a frustrum of a cone; a substantially conical diffuser section having an outer surface terminating in an apex, the diffuser section axially aligned within the nozzle body shell in a spaced relation therewith so as to form an extraction chamber with the inner surface of the nozzle body shell and the outer surface of the substantially conical diffuser section; an extracted material outlet port positioned axially through the substantially conical diffuser section; and at least one rejected material capillary outlet located below the apex of the diffuser section.

10 Claims, 4 Drawing Sheets

MATERIAL EXTRACTION NOZZLE COUPLED WITH DISTILLATION TOWER AND VAPORS SEPARATOR

This is a division of copending application Ser. No. 07/521,957, filed on May 11, 1990 now U.S. Pat. No. 5,106,514 issued on Apr. 21, 1992.

FIELD OF THE INVENTION

The present invention relates to an apparatus and method for the centripetal separation of mixtures of materials having different densities and more particularly to an extraction nozzle for the centripetal separation of fluids.

BACKGROUND OF THE INVENTION

In the separation of materials of varying densities, it is well known to impart centripetal force to the material so that the resulting acceleration causes a density related distribution of material. For example, cyclonic collectors have been employed for many years for the removal of solid particles from gaseous streams. A cyclonic collector is a stationary device with no moving parts which converts the entering gas stream to a vortex. Centripetal force acts on the particles in the gas stream causing them to migrate to the outside wall where they are collected by inertial impingement. Since the force developed can be many times that of the force due to gravity, very small particles can be separated out of the gas stream. U.S. Pat. No. 325,521 discloses a very early cyclone design for the separation of dust from air. Cyclonic collectors are frequently used in the control of air pollution. Various conventional cyclonic collector designs are described in Kirk-Othmer, ENCYCLOPEDIA OF CHEMICAL TECHNOLOGY, Third Edition, John Wiley & Sons, 1978, Vol. 1, pages 667-673, incorporated by reference for the disclosure of such details.

As can be appreciated, cyclones and modified cyclonic collectors can be used to remove entrained liquids from a gas stream. Even the crudest device can capture liquid droplets larger than 100 micrometers if care is taken to prevent liquid reentrainment. Wet cyclones are described in some detail by Stern, Caplan and Bush in CYCLONE DUST COLLECTORS, American Petroleum Institute, New York, N.Y., 1955. Gas-liquid cyclones are also discussed in Rousseau, HANDBOOK OF SEPARATION PROCESS TECHNOLOGY, John Wiley & Sons, 1987, pages 132-137, incorporated herein by reference.

Fluid cyclones and hydrocyclones have found acceptance within the paper-making and metallurgical industries and elsewhere. The most common type of hydrocyclone utilizes a straight conical design wherein fluid enters through a tangential inlet into a short cylindrical section. A vortex is created in the cylindrical section and in a conical section located directly below as the fluid spirals in a path moving downward and inward, then upward in a helical path to an exit pipe co-axial with the cylindrical section. As with the dry cyclone, the centripetal acceleration imparted by the rapid rotation of the fluid causes dense particles to be forced outward to the outer wall surfaces of the cylindrical and conical sections. The dense particles are transported in the slower moving boundary layer downward towards the apex of the conical section where an exit orifice is therein provided. The high centripetal force near the center creates a liquid-free zone referred to by those skilled in the art as a vortex cone. In the conical cyclone, this core is filled with air and a back pressure at the exit of the hydrocyclone is required to prevent air from being sucked in.

Related patents include U.S. Pat. No. 3,862,714, which discloses an apparatus for the vortical separation of fluid material. The apparatus includes an annular zone between two rotating cylindrical surfaces wherein the fluid material is introduced into this zone to form a forced vortex having an axial component of motion of predetermined profile. Centripetal acceleration causes a distribution of the fluid material with the more dense material located further from the axis.

U.S. Pat. No. 4,251,368 discloses a cyclone separator having a generally cylindrical first portion with a plurality of substantially equally spaced directed feeds. Adjacent to and coaxial with the first portion is a generally cylindrical second portion open at its far end. The first portion has an axial overflow outlet opposite the second portion. Optionally, a flow-smoothing taper is provided between the inlet portion and the separating portion. The apparatus disclosed finds utility in the removal of oil from water in oil-rig drilling and aboard ships involved in the sea transport of oil.

U.S. Pat. No. 4,389,307 is directed to a form of fluid cyclone in which the velocity energy of the exit fluid is converted into exit pressure permitting the device disclosed to discharge at atmospheric pressure or higher while a vacuum exists in the central core of the vortex.

U.S. Pat. No. 4,844,817 discloses a system for the separation of oil from oily water where the oily water is available at relatively low pressure insufficient to drive a hydrocyclone separator. A particular combination of pumps and hydrocyclones is disclosed which is said to be effective under low pressure situations.

Despite these advances in the art, there exists a need for an improved material extraction nozzle capable of effectively separating materials of different densities, particularly gas-liquid mixtures.

SUMMARY OF THE INVENTION

According to the present invention, there is provided a material extraction nozzle for separating a mixture of materials of different densities, comprising: a nozzle body shell having an outer surface with a tangentially located material inlet at an upper portion thereof and an inner surface defining in part a frustrum of a cone; a substantially conical diffuser section having an outer surface terminating in an apex, the diffuser section axially aligned within the nozzle body shell in a spaced relation therewith so as to form an extraction chamber with the inner surface of the nozzle body shell and the outer surface of the substantially conical diffuser section; an extracted material outlet port positioned axially through the substantially conical diffuser section; a throat piece having a throat body, the throat piece positioned so that the throat body is located below and spaced apart from the apex of the diffuser so as to form a throat; and at least one rejected material capillary outlet located below the ape of the diffuser section.

Therefore, it is an object of the present invention to provide a material extraction nozzle which is effective in the separation of mixtures of materials having different densities, particularly fluids such as gas-liquid mixtures.

Another object of the present invention resides in the provision of a method for separating a mixture of materials having different densities which utilizes centripetal acceleration to divide the mixture.

Yet another object of the present invention lies in the provision of a novel gas liquefaction system which does not require the use of a compressor/expander unit.

Still another object of the present invention is to provide a mass transfer system which does not require the use of contacting towers.

It is a further object of the present invention to provide a mass transfer system which is easily maintained, with minimal system downtime.

Other objects and the several advantages of the present invention will become apparent to those skilled in the art upon a reading of the specification and the claims appended thereto.

DETAILED DESCRIPTION OF THE INVENTION

Figure 1:
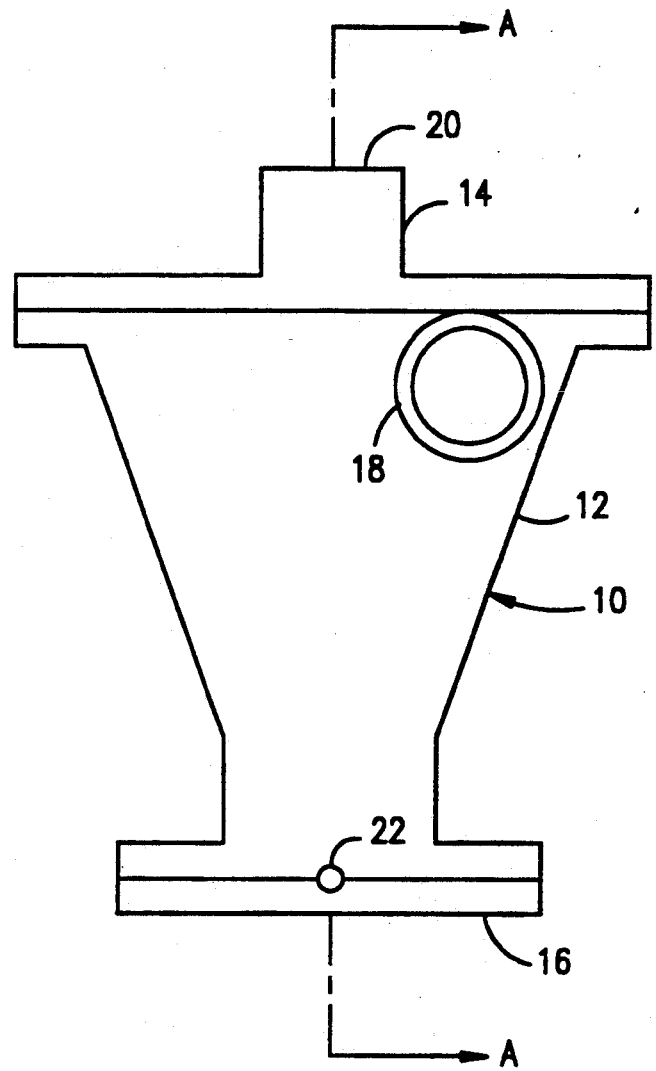
FIG. 1 is a side plan view of a material extraction nozzle in accordance with the present invention.

The present invention is best understood by reference to the appended figures, which are given by way of example and not of limitation. Referring now to FIG. 1, a side plan view of material extraction nozzle 10 is shown. Material extraction nozzle 10 is primarily comprised of three major sections, although it is to be understood that these sections themselves may be comprised of a plurality of parts as dictated by construction and fabrication considerations. The three major sections are nozzle body shell 12, diffuser section 14 and throat piece 16. Located within the upper portion of nozzle body shell 12 is material inlet 18. Extracted material outlet 20 is located at the top of diffuser section 14, while rejected material outlet capillary 22 is located near the bottom of liquid extraction nozzle 10. As shown, rejected material outlet capillary 22 may be formed using semicircular apertures placed at the plane where nozzle body shell 12 and throat piece 16 meet to form an assembly, although such capillaries may be formed wholly within diffuser section 14 or throat piece 16. As will be appreciated by those skilled in the art, in this description and in the claims appended thereto, material extraction nozzle 10 will be described in a particular orientation for convenience of expression. It is to be understood, however, that the material extraction nozzle of the present invention will function in any orientation, and terms such as "upper", "lower", "top" and "bottom" should not be construed as limiting the material extraction nozzle described herein to any particular orientation.

Figure 2:
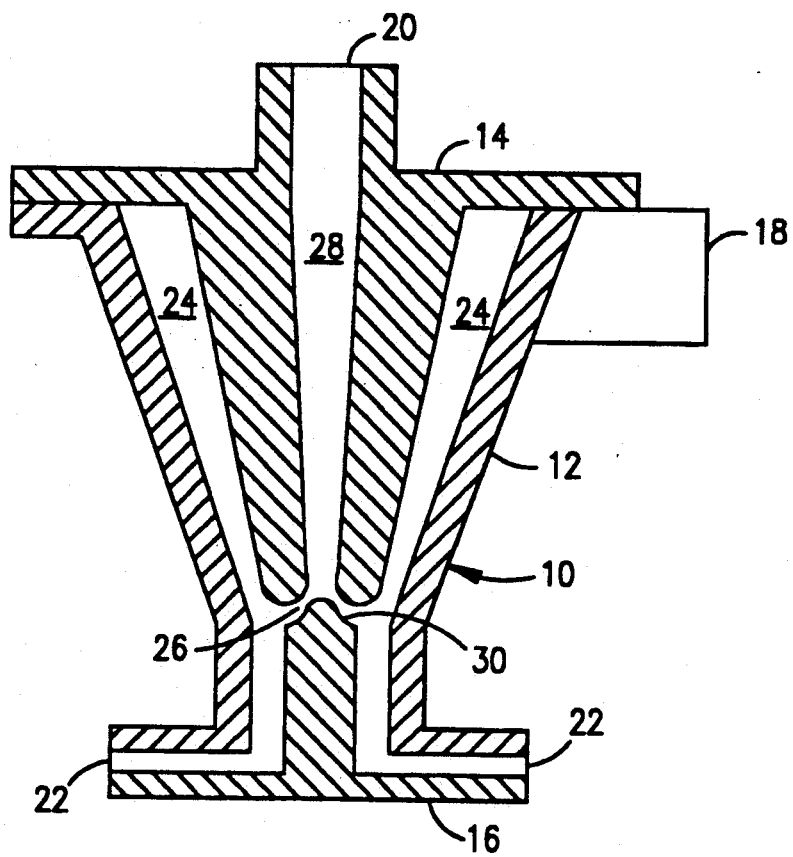
FIG. 2 is a sectional view of the material extraction nozzle of the present invention taken along the line A—A of FIG. 1.

Referring now to FIG. 2, a sectional view of the material extraction nozzle of the present invention taken along the line A—A of FIG. 1 is presented. From FIG. 2, it can be seen that the interior surface of nozzle body shell 12 defines, as is preferred, a frustrum of a cone. Diffuser section 14 is also of substantially conical configuration, having an outer surface terminating at its bottom in an apex. As is preferred, diffuser section 14 is axially aligned within nozzle body shell 12 in a spaced relation so as to form extraction chamber 24 with the inner surface of nozzle body shell 12 and the outer surface of the substantially conical diffuser section 14. An extracted material outlet port 28 is positioned axially through substantially conical diffuser section 14, extracted material outlet port 28 terminating at extracted material outlet 20.

Still referring to FIG. 2, throat piece 16 is shown to have a throat body 30 which is positioned so that it is located below and spaced apart from the apex of diffuser section 14, so as to form throat 26. A pair of rejected material capillary outlets 22 are located below the apex of diffuser section 14. While at least one rejected material capillary outlet 22 is required, the number actually provided for a given application will depend upon the application itself.

Figure 3:
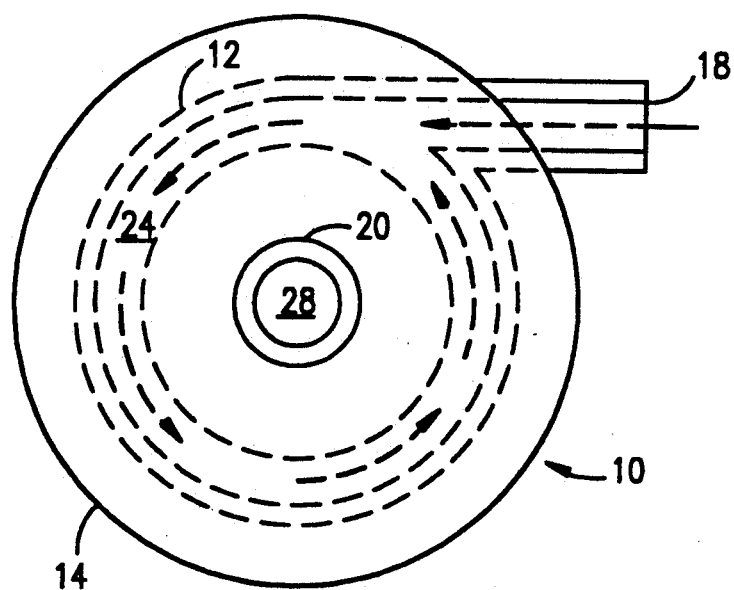
FIG. 3 is a top plan view of the material extraction nozzle of FIG. 1.

The operation of the nozzle will now be described by reference to FIG. 2 and FIG. 3. While a variety of material mixtures can be effectively separated using the material extraction nozzle of the present invention, its operation will be described for a gas containing liquid. A gas containing liquid, in free form or in vapor form, enters material extraction nozzle 10 through material inlet 18 located in the upper portion of nozzle body shell 12. As shown in FIG. 3, material inlet 18 is at an offset to the center axis of material extraction nozzle 10 to create a spin as the material flows downward to the bottom of the extraction chamber 24. The centripetal force created by the spinning motion of the gas causes the more dense liquids to separate from the gas and flow down the outer wall of extraction chamber 24. At the bottom of extraction chamber 24, the gas stream is directed upward through to the inside of diffuser section 14 by throat body 30 of throat piece 16. The liquid is allowed to continue its downward flow to rejected material capillaries 22 located in the plane where throat piece 16 and diffuser section 14 join. As can be appreciated, in practical applications some gas may also flow out with the liquid.

Liquid in the gas may enter the nozzle in vapor form, yet still be separated. As those skilled in the art may recognize, this involves a more complex level of design for the material extraction nozzle. While the components of the material extraction nozzle 10 and the flow patterns existing therein remain the same as in the gross separation described above, complexity enters into the design in the sizing of the cross-sectional areas of extraction chamber 24, throat body 30 and diffuser section 14. Other design factors include the sizing of the rejected material capillary outlets 22, the inlet gas composition, inlet pressure, flow rate, temperature, desired liquid extraction composition, efficiency, outlet liquid pressure and outlet gas pressure. Ideally, the goal is to design the gas flow path to resemble an isentropic converging-diverging nozzle with Mach flow obtained at throat 26. As can be appreciated, for an ideal gas flowing through a high efficiency nozzle, given a particular inlet pressure, it is possible to attain a pressure at throat 26 which is lower than the exiting pressure. This lower pressure corresponds to a lower temperature. For a gas containing liquid, material extraction nozzle 10 takes advantage of this phenomena by separating the liquid formed by sub-cooling from the gas stream at the coldest point in the nozzle. The advantage comes from the reduced compression required downstream of the material extraction nozzle to return the gas to its inlet pressure.

In an alternate embodiment which is capable of offering additional benefits in certain applications, rather than a fixed extraction chamber 24 or throat 26 geometry, a material extraction nozzle can be constructed which would make it possible to actuate diffuser section 14 or throat body 30 to vary existing cross-sectional areas to increase the operating range of the device.

Material extraction nozzle 10 can also be used as a liquid-liquid separator in which the bulk liquid is the lighter fluid, i.e., separation of water from bulk oil. Another use for the material extraction nozzle of the present invention is in a process called centrifugation where gases are separated as a result of slightly different forces acting on the various molecules owing to their different masses. This method is often employed in the separation of uranium isotopes.

As may be readily appreciated, the material extraction nozzle of the present invention can be employed wherever a conventional separator or centripetal separator is presently being used for gross liquid-gas separation. Additionally, it would be expected to be effective in applications where a coalescer or filter/separator is required. The advantage of the material extraction nozzle over these separators is its lower cost and reduced space requirements. Another advantage lies in the fact that the material extraction nozzle may be installed "in-line". Where the turndown capability of the material extraction nozzle is a design consideration, further turndown can be obtained by installing material extraction nozzles in parallel with isolation valves for those material extraction nozzles not presently in use.

Another benefit which can be realized from the use of the material extraction nozzle lies in a reduced need for sophisticated controls as compared to a system employing a conventional separator. For example, in applications where the primary objective is liquid-free effluent gas, it may be acceptable to slip gas in with the liquid stream so that the control on the liquid outlet line requires only a sized orifice or restrictive control valve. In those applications where gas in the liquid effluent is undesirable, a liquid reservoir area, integral to the device or existing as a separate small vessel, may be used with conventional level controls to dump as the liquid accumulates in the reservoir. As stated above, it may be desirable to actuate the throat area or diffuser to improve the operating range of the device.

When used in gas-liquid extraction, the material extraction nozzle can be used in place of such existing conventional technology as Joule-Thompson (JT) valves and expander/compressor units in gas liquefaction plants. A those skilled in the art recognize, a JT valve allows isenthalpic expansion of a gas across the valve. The corresponding drop in temperature is the result of the Joule-Thompson effect of expanding nonideal gases. For a given pressure drop, isenthalpic expansion results in a higher final temperature than isentropic expansion due to friction losses. An expander attempts to approach isentropic expansion by allowing the gas to perform shaft work. Conventionally this shaft work is used to drive a coupled re-compressor to incrementally boost the pressure of the processed tailgas. Usual isentropic efficiencies of 75 to 85% are achieved for the expander and 65 to 80% for the re-compressor. The efficiency losses are the result of friction, heat loss, and gear losses.

A conventional nozzle (straight-through, converging-diverging) can attain isentropic efficiencies of 94 to 99%. Larger nozzles have greater efficiencies since the inefficiencies are primarily due to frictional losses at the boundary layer. The larger the flow area, the lower the boundary layer ratio to the overall flow area. Although the efficiency of the material extraction nozzle of the present invention is expected to be somewhat lower than that of a large straight-through nozzle, due to the increased frictional losses stemming from radial forces exerted on the gas which cause the spinning motion, it is believed the material extraction nozzle will attain isentropic efficiencies comparable to that of an expander/compressor unit. As such, the material extraction nozzle of the present invention has the potential of offering the efficiency of an expander/compressor unit in a package as simple as a JT valve. Even when the efficiency is less than an expander/compressor unit, the reduced capital costs and simplicity of operation can permit the extraction nozzle to compete on a cost/performance basis with such an installation. JT valves are used extensively in LPG recovery plants, nitrogen rejection plants, and other gas liquefaction processes.

Figure 4:
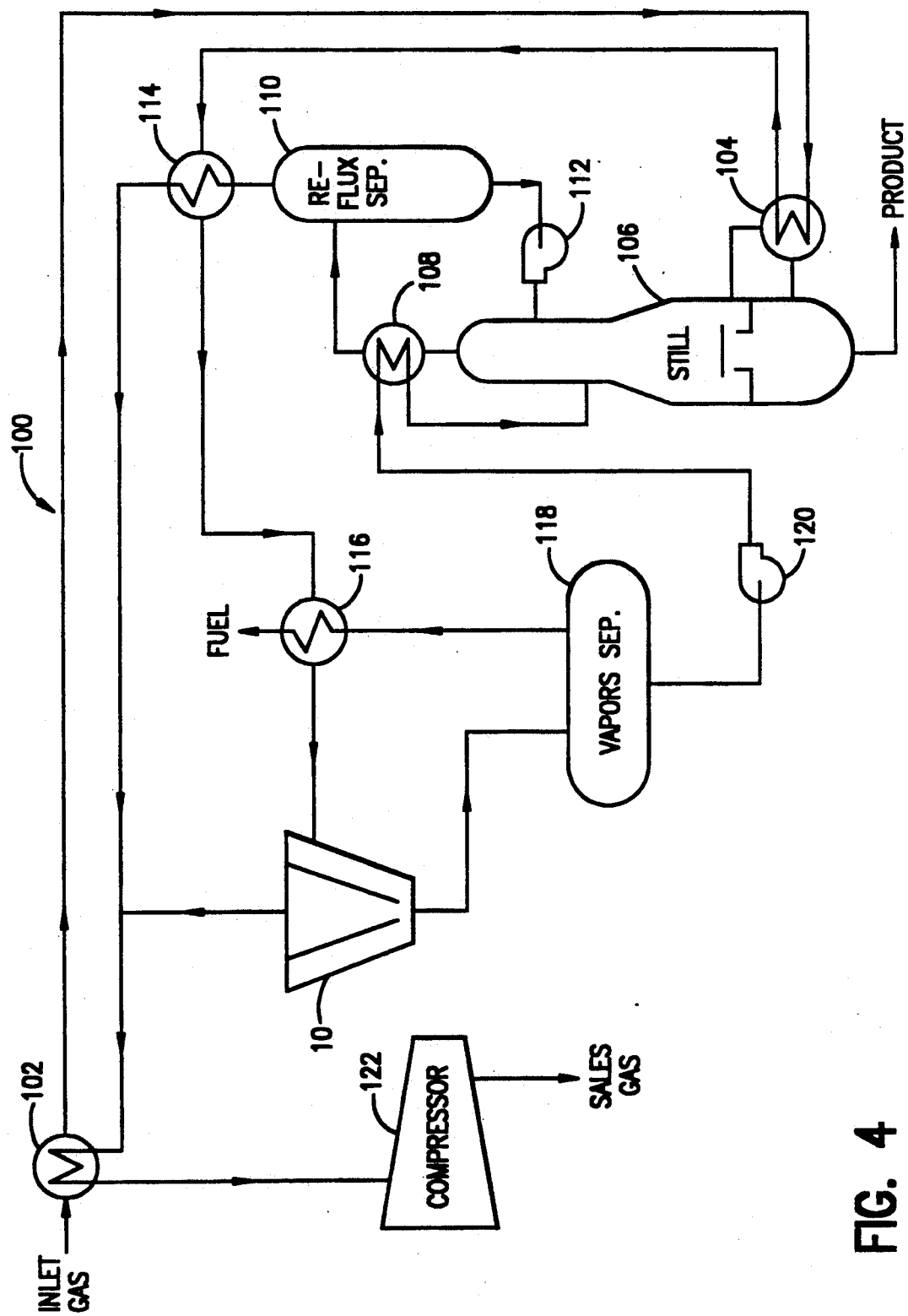
FIG. 4 is a schematic representation of a material extraction nozzle installed in a gas liquefaction plant.

As mentioned, the material extraction nozzle can be used in place of an expander/compressor unit in a gas liquefaction process. Referring to FIG. 4, a schematic representation of a gas liquefaction plant 100 employing material extraction nozzle 10 is presented. As may be seen, the chief components of gas liquefaction plant 100 include material extraction nozzle 10, distillation tower 106, heat exchangers 102, 104, 114 and 116, compressor 122, reflux separator 110, condenser 108, flash vapors separator 118, and pumps 112 and 120. As those skilled in the art recognize, with the exception of the use of material extraction nozzle 10 in place of an expander/compressor unit, gas liquefaction plant 100 is of conventional design. In operation, the inlet gas is cooled at heat exchanger 102 with the exiting gas from material extraction nozzle 10 and heat exchanger 114 and sent to material extraction nozzle 10. The condensed liquid from nozzle 10 flows to flash vapors separator 118, where the vapors are withdrawn for use as fuel in the plant. The liquids are pumped to distillation tower 106 which operates at recompressor suction pressure. The vapors from distillation tower 106 are routed for heat exchange at condenser 108 with the incoming liquid then combined with the residue gas. Product is drawn from the bottom of distillation tower 106.

Figure 5:
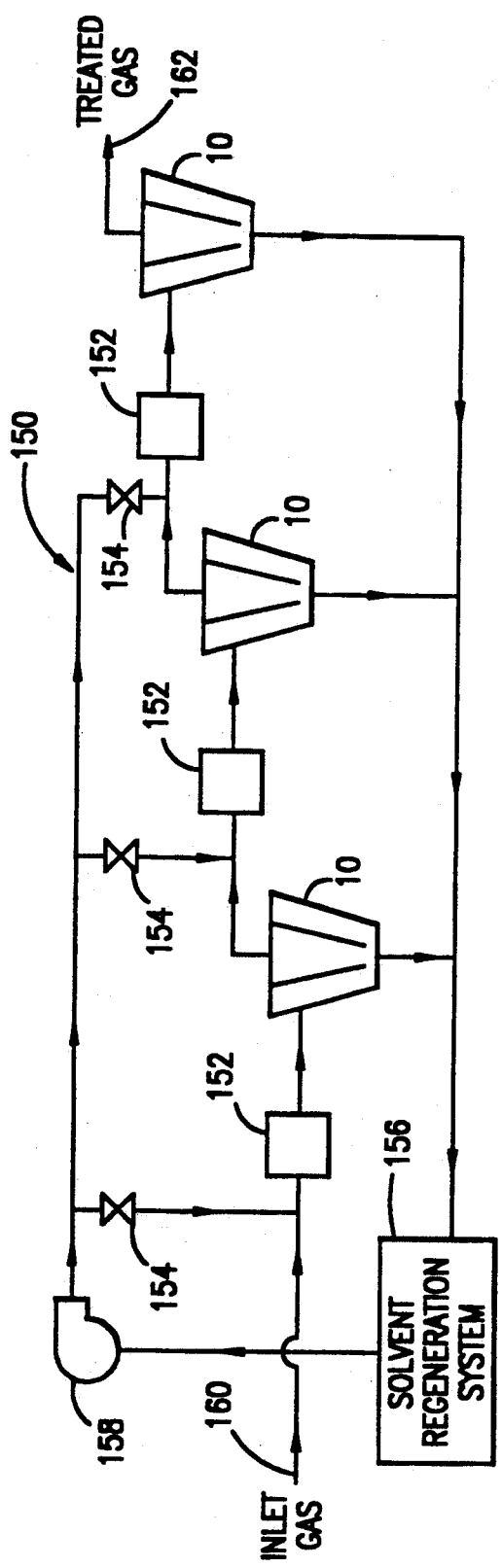
FIG. 5 is a schematic representation of a mass transfer system employing material extraction nozzles installed in a cross-flow cascade arrangement.

Another use for the material extraction nozzle of the present invention is in mass transfer operations which ordinarily would employ contacting towers. Referring now to FIG. 5, mass transfer system 150 is shown, schematically, as being comprised of a series of material extraction nozzles 10 set up with solvent injection at static mixers 152 installed upstream of each material extraction nozzle 10. The effect of such an installation is to create a cascade of high efficiency stages in a compact design, eliminating the use of an expensive contacting tower. One of the operational advantages of such a system includes the ability to perform maintenance and troubleshooting on each stage while on-line by simply bypassing, at a flow control valve 154, a particular stage. As can be appreciated, foaming in such a system would be practically eliminated by the high centrifugal forces inside the nozzle.

Figure 6:
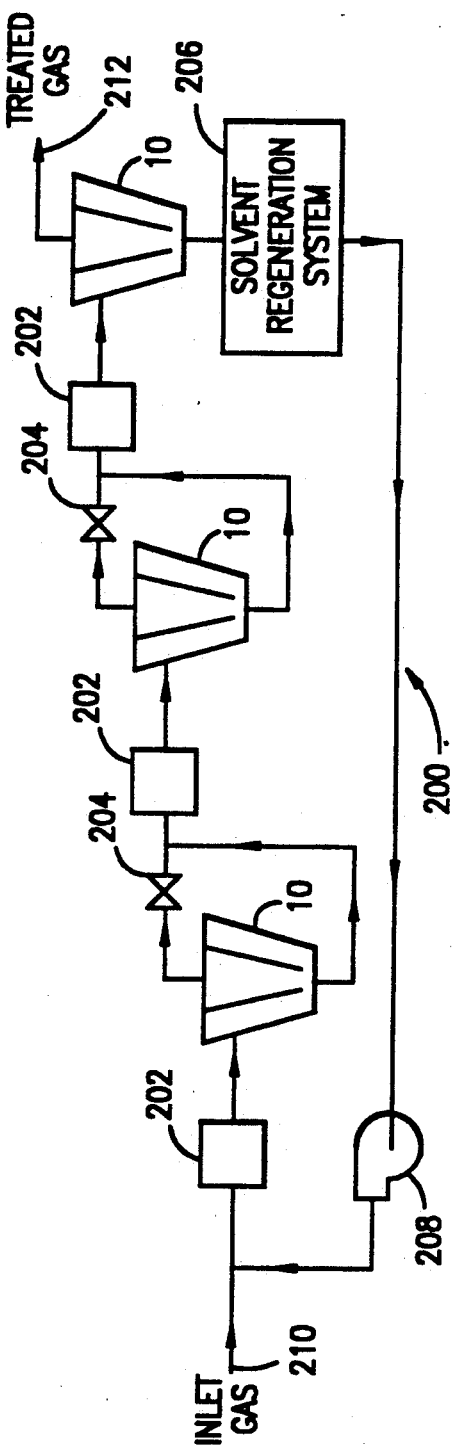
FIG. 6 is a schematic representation of a mass transfer system employing material extraction nozzles installed in a counter-current cascade arrangement.

If the particular mass transfer system application allows for sufficient pressure drop, the cascade could be set up as a counter-current system to minimize solvent rates. A schematic representation of a countercurrent mass transfer system 200 is presented in FIG. 6. As shown in FIG. 6, mass transfer system 200 is comprised of a series of material extraction nozzles 10 set up with solvent injection at static mixers 202 installed upstream of each material extraction nozzle 10. As with the previously described mass transfer system, this system also offers the ability to perform maintenance and troubleshooting on each stage while on-line by bypassing the flow of material for a particular stage at a flow control valve 204.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the amended claims.

What is claimed is:

1. A mass transfer system, comprising: a plurality of material extraction nozzles being arranged in a cascade relationship, each material extraction nozzle having a static mixer arranged to effect injection of a solvent into material being extracted, said static mixer being installed upstream of each said material extraction nozzle, wherein at least one of said material extraction nozzle comprises:
    (i) a nozzle body shell having an outer surface with a tangentially located material inlet at an upper portion thereof and an inner surface defining in part a frustrum of a cone;
    (ii) a substantially conical diffuser section having an outer surface terminating in an apex, said diffuser section axially aligned within said nozzle body shell in a spaced relation therewith so as to form an extraction chamber with said inner surface of said nozzle body shell and said outer surface of said substantially conical diffuser section;
    (iii) an extracted material outlet port positioned axially through said substantially conical diffuser section;
    (iv) at least one rejected material capillary outlet located below the apex of said diffuser section; and
    (v) a throat piece having a throat body, said throat piece positioned so that said throat body is located below and spaced apart from the apex of said diffuser section so as to form a throat, wherein said diffuser section and said throat body are configured and arranged so as to create a Mach flow condition at said throat.

2. The mass transfer system of claim 1, wherein said tangentially located material inlets of said material extraction nozzles are effective in creating a spinning motion of the material entering therethrough as the material passes into said extraction nozzles.

3. The mass transfer system of claim 1, wherein said at least one rejected material capillary outlet of said nozzles are in fluid communication with a solvent regeneration system.

4. The mass transfer system of claim 1, wherein each of said at least one rejected material capillary outlet of each of said nozzles are positioned below said respective throat.

5. The mass transfer system of claim 1, wherein each of said nozzles comprise at least two rejected material capillary outlets of which at least two are positioned below the apex of said respective diffuser section.

6. A gas liquefaction system, comprising:
    (a) a material extraction nozzle which includes:
        (i) a nozzle body shell having an outer surface with a tangentially located material inlet at an upper portion thereof and an inner surface defining in part a frustrum of a cone;
        (ii) a substantially conical diffuser section having an outer surface terminating in an apex, said diffuser section axially aligned within said nozzle body shell in a spaced relation therewith so as to form an extraction chamber with said inner surface of said nozzle body shell and said outer surface of said substantially conical diffuser section;
        (iii) an extracted material outlet port positioned axially through said substantially conical diffuser section;
        (iv) at least one rejected material capillary outlet located below the apex of said diffuser section; and
        (v) a throat piece having a throat body, said throat piece positioned so that said throat body is located below and spaced apart from the apex of said diffuser section so as to form a throat, wherein said diffuser section and said throat body are configured and arranged so as to create a Mach flow condition at said throat;
    (b) a gas feed line in fluid communication with said material inlet of said nozzle body shell of said material extraction nozzle; and
    (c) a distillation tower in fluid communication with said at least one rejected material capillary outlet of said material extraction nozzle.

7. The gas liquefaction system of claim 6, wherein said tangentially located material inlet of said material extraction nozzle is effective in creating a spinning motion of the material entering therethrough as the material passes into said extraction chamber.

8. The gas liquefaction system of claim 6, wherein said at least one rejected material capillary outlet of said material extraction nozzle is in fluid communication with a vapors separator.

9. The gas liquefaction system of claim 6, wherein each of said at least one rejected material capillary outlet is positioned below said throat.

10. The gas liquefaction system of claim 6, wherein said nozzle comprise at least two rejected material capillary outlets of which at least two are positioned below the apex of said diffuser section.

* * * * *